United States Patent [19]

McCown et al.

[11] Patent Number: 5,099,436

[45] Date of Patent: Mar. 24, 1992

[54] METHODS AND APPARATUS FOR PERFORMING SYSTEM FAULT DIAGNOSIS

[75] Inventors: Patricia M. McCown, Creskill; Timothy J. Conway, Highland Park, both of N.J.

[73] Assignee: Allied-Signal Inc., Morris Township, Morris County, N.J.

[21] Appl. No.: 266,722

[22] Filed: Nov. 3, 1988

[51] Int. Cl.$^5$ .............................................. G06F 15/18
[52] U.S. Cl. ..................................... 364/550; 371/26; 395/911; 395/912; 395/914
[58] Field of Search .................... 364/550, 513; 371/26

[56] References Cited

U.S. PATENT DOCUMENTS

| | | | |
|---|---|---|---|
| 4,632,802 | 12/1986 | Herbst et al. | 376/216 |
| 4,642,782 | 2/1987 | Kemper et al. | 364/550 |
| 4,644,479 | 2/1987 | Kemper et al. | 364/550 |
| 4,649,515 | 3/1987 | Thompson et al. | 364/900 |
| 4,658,370 | 4/1987 | Erman et al. | 364/513 |
| 4,704,695 | 11/1987 | Kimura et al. | 364/513 |
| 4,752,890 | 6/1988 | Natarajan et al. | 364/513 |
| 4,754,409 | 6/1988 | Ashford et al. | 364/513 |
| 4,763,277 | 8/1988 | Ashford et al. | 364/513 |
| 4,766,595 | 8/1988 | Gollomp | 371/23 |
| 4,841,456 | 6/1989 | Hogan, Jr. et al. | 364/550 |
| 4,847,795 | 7/1989 | Baker et al. | 364/579 |

FOREIGN PATENT DOCUMENTS

| | | |
|---|---|---|
| 58-142455 | 8/1983 | Japan . |
| 59-79170 | 5/1984 | Japan . |
| 59-206713 | 11/1984 | Japan . |
| 60-91413 | 5/1985 | Japan . |

OTHER PUBLICATIONS

DeKleer, "Choices Without Backtracking," Proceedings of the American Association of Artificial Intelligence 1984 Conference, pp. 79–85.

Davis, "Diagnostic Reasoning Based on Structure and Behavior," in Qualitative Reasoning about Physical Systems at pp. 347–410, The MIT Press, 1985.

Kuipers, "The Limits of Qualitative Stimulation," Proc. of the Inter. Joint Conf. on Art. Intel., IJCAI 85.

Pan et al., "P.I.E.S.: An Engineer's Do–It–Yourself Knowl. Sys. for Inter. of Parametric Test Data," Proc. of the Amer. Assoc. of Art. Intel. Conf., pp. 836–843, 1986.

Forbus, "Interpreting Measurements of Physical Systems," Proceedings of the American Association of Artificial Intelligence Conference, pp. 113–117, 1986.

Fink et al., "The Integ. Diag. Model—Towards a Second Gen. Diag. Expert," pp. 188–197, Proc. of the Air Force Workshop on Art. Intel. Appl. for Integrated Diagnostics, Jul. 1986.

Chu, "Approaches to Auto. Fault Diag.: A Crit. Eva.," Rpt. #SETR-86-001 of the Software Eng. Tech. Series prepared by the Allied-Signal Aerospace Co.—Bendix Test Systems Div., Jul. 1986.

(List continued on next page.)

*Primary Examiner*—Thomas G. Black
*Attorney, Agent, or Firm*—Christopher N. Malvone; Howard G. Massung; Robert A. Walsh

[57] ABSTRACT

A diagnostic tool based on a hybrid knowledge representation of a system under test is disclosed. Data collected from the system during its operation is compared to an event based representation of the system which comprises a plurality of predefined events. An event is recognized when the collected data matches the event's critical parameter. The recognized event is analyzed and an associated set of ambiguity group effects, which specify components to be re-ranked in an ambiguity group according to an associated ranking effect. Additionally, a symptom-fault model and a failure model can be analyzed to determine symptom-fault relationships and failure modes which are applicable to the system operation. Each applicable symptom-fault relationship and failure mode is also associated with a set of ambiguity group effects which rerank the ambiguity group. A structural model is analyzed starting with the components in the ambiguity group having the greatest probability of failure. As a result of the analysis, maintenance options specifying tests to be performed on the system are output.

24 Claims, 9 Drawing Sheets

OTHER PUBLICATIONS

Abbott et al., "Faultfinder; a diag. expert sys. with graceful degradation for onboard aircraft appli.," 14th Inter. Sym. on Aircraft Integrated Monitoring Systems, 1987.

Kolodner, "Extending Prob. Solver Capabilities through Case-Based Inference," Proc. of the 4th Ann. Inter. Machine Learning Workshop, pp. 21–30, 1987.

Kamal et al., "Event-Based Learning for Monitoring Rotating Machinery," 2nd Proc. of Appli. of Art. Intel. in Engineering Conference, pp. 1–20, Aug. 1987.

Holtzblatt, "Diagnosing Multiple Failures Using Knowledge of Component States", Proceedings of the CAIA 1988, pp. 134–143.

Abbott, "Robust Oper. Diag. as Prob. Solving in a Hypothesis Space," 1988 Proc. of the Amer. Assoc. of Art. Intel., pp. 369–394.

Koton, "Reasoning About Evidence in Causal Expl.," Proc. Case-based Reasoning Workshop sponsored by DARPA, pp. 260–270, May 1988.

Rose, "Thinking Machine—An Electronic Clone of a Skilled Engineer is Very Hard to Create," in the Wall Street Journal, Aug. 12, 1988.

METHODS AND APPARATUS FOR PERFORMING SYSTEM FAULT DIAGNOSIS

FIELD OF THE INVENTION

The invention relates to methods and apparatus for analyzing systems. More specifically, it relates to a hybrid knowledge representation of a system and methods for analyzing the representation to provide faster and improved analysis of the system.

BACKGROUND OF THE INVENTION

As the complexity of man-made systems increases, the complexity of the tasks involved in maintaining such systems also increases. The maintenance tasks include, by way of example only, fault diagnosis, fault location, performance monitoring, performance optimization and repair. These tasks are typically performed by an expert technician, by analytical diagnostic tools or by a combination thereof.

Many diagnostic tools are known for use in maintenance tasks, however, they are all limited in one or more respects. Early diagnostic tools utilized snapshot monitoring wherein an instantaneous picture of the system under test is developed. Another test concept used in early diagnostic tools was stimulus-response testing wherein test equipment is used to develop appropriate stimulus waveforms and the response of the system under test is analyzed. In fact, many systems in use today are still maintained and tested by diagnostic tools using these techniques.

Diagnostic tools using steady state and stimulus-response testing techniques, however, are unable use the full spectrum of information available about the system under test. In particular, these tools make no use of knowledge concerning the design or the prior maintenance history of the system under test. These systems, therefore, do not provide reliable fault diagnosis of systems. Furthermore, such systems have severely limited ability to reason about results obtained during testing or monitoring.

As a result of the limited reasoning ability, expert systems have been incorporated into various diagnostic tools. In a common form, the expert system uses a surface knowledge representation of the system under test to analyze and reason about potential faults in the system. Surface knowledge representations typically associate a set of symptoms with a set of faults which association is frequently presented in the form of a fault tree. Surface knowledge representations also frequently take the form of a set of rules of the If-Then form. Data or information for the surface knowledge representation is usually obtained from the expert technician or the system designer.

These systems have had limited successes in simple systems where maintenance experts have accumulated enough experience in maintaining the system to provide accurate rules for most of the possible system faults. In cases where the system under test is somewhat complex, however, it is often very difficult to embody the expert's experience in a set of rules to drive the expert system, even where the expert has had sufficient experience with the complex system. See, for example, "The Thinking Machine—An Electronic Clone of a Skilled Engineer is Very Hard to Create", in the Aug. 12, 1988 issue of the Wall Street Journal on page 1, wherein the efforts of the Southern California Edison Co. to develop an expert system to diagnose faults in one of their dams is described. The expert system was to be based on a set of rules which embodied the knowledge of a civil engineer having two decades of related experience. After a significant investment in time and money and after narrowing the scope of the project, limited diagnostic success was achieved, however, the diagnostic tool was not put into regular use.

Expert systems based on surface knowledge representations, therefore, require an exhaustive set of a priori rules which accurately encompass the spectrum of the possible faults of the system under test to be effective. Furthermore, such expert systems perform poorly when fault conditions occur which are beyond the surface knowledge heuristic rule base since there is no knowledge base upon which further reasoning can occur. Expert systems based on surface knowledge representations, therefore, offer limited reasoning capabilities.

Expert systems have also incorporated deep knowledge representations of systems under test, wherein the functional and structural qualities of a system's components are qualitatively modeled to show connectivity and behavioral relationships. This approach enables a diagnostic tool to deal with imprecise behavioral and structural characteristics of a system, such as dynamic changes in connectivity, which can not be addressed in other approaches, thereby offering potential for greater flexibility in reasoning. Such qualitative models can represent the operation of a system without an exhaustive a priori enumeration of all possible failure models, as required in surface knowledge approaches.

Diagnostic tools based on such qualitative models can, however, easily become computationally unwieldly since the number of computations required to use the qualitative model is proportional to the connectivity of the system under test. The connectivity of a system increases as a combinatorial function of the number of components in the system, so that qualitative models which represent complex systems having many functions and components become computationally untractable.

Various combinations of the previously discussed diagnostic tools have been suggested. In Report No. SETR-86-001 of the Software Engineering Technical Report Series prepared by the Allied-Signal Aerospace Company, a two layer expert system using a surface knowledge representation embodying heuristic rules developed by system maintenance experts and a deep knowledge representation embodying component behavior and system connectivity is suggested. It is also suggested to use reliability statistics as an adjunct to the expert system. The suggested two layer expert system would first diagnose a system based on the heuristic rules of the surface knowledge representation. The deep knowledge representation is referenced only when a failure mode which is outside the failures embodied in the rule base is encountered. The suggested two layer expert system, therefore, does not provide an integrated diagnostic tool. Rather, in most cases such a system is dependent on a heuristic surface knowledge representation and the required exhaustive enumeration of a priori rules, which can be difficult to develop. Causal reasoning with a deep knowledge representation would be referenced only when heuristic reasoning with a surface knowledge representation fails. The results obtained with such a diagnostic tool would only be marginally improved since the knowledge representations are not truly integrated. Furthermore, the suggested diagnostic tool fails to solve the problem of the computationally untractable qualitative models in the deep knowledge representation when such models are referred to.

A diagnostic system that combines a surface knowledge expert system with a deep knowledge expert system was also suggested in "The Integrated Diagnostic Mode-Towards a Second Generation Diagnostic Expert System", published in July 1986 in the Proceedings of the Air Force Workshop on Artificial Intelligence Applications for Integrated Diagnostics at pages 188 to 197. This diagnostic tool separates the two knowledge representations until a decision is to be made. At the time of decision, an executor process arbitrates between the two expert systems to make a decision. This tool, therefore, fails to integrate the two types of knowledge and has problems similar to the suggested two layer expert system discussed above.

A diagnostic tool which provides an integrated knowledge representation of a system, combining a variety of knowledge representations of a system as well as other system information is needed. Such a diagnostic tool should provide flexible decisions similar to those provided by expert systems utilizing deep knowledge representations, but should also provide quick and efficient decisions as well as improved diagnostic decisions.

SUMMARY OF THE INVENTION

According to the present invention, a diagnostic tool using a hybrid knowledge representation of the system under test is presented. An event based representation of the system under test comprises a plurality of event records that specify predefined events that can occur in the system under test which are stored as a data base. The event based representation defines the temporal performance of the system under test.

A data acquisition module is provided to collect operational data from the system under test which is compared to the event based representation to recognize predefined events that have occurred in the system under test. An event is recognized when the critical parameters in the corresponding event record are matched to a data sample from the collected operational data.

Each predefined event in the event based representation is associated with a set of ambiguity group effects that specifies components and a ranking effect for each specified component. The ambiguity group effects are applied to an ambiguity group, which is a listing of components in the system under test which are ranked according to their probabilty of failure. Every recognized event and events which are related to the recognized events are analyzed to determined a subset of the associated set of ambiguity group effects to be applied to the ambiguity group. The analysis involves checking the collected operational data to verify the occurrence of affected parameters as defined in recognized events or in events related to the recognized events. Once the subsets of ambiguity group effects is determined, the specified components are re-ranked in the ambiguity group according to the associated ranking effects.

In the preferred embodiment, a symptom-fault model of the system under test comprising a plurality of symptom-fault relationships in a data base is also part of the hybrid knowledge presentation. The operation of the system under test is observed and data is formatted by the observer. The observed data is compared to each symptom-fault relationship and any matches are noted. Each symptom-fault relationship is also associated with a set of ambiguity group effects. The ambiguity group effects associated with the matched symptom-fault relationships are selected and the specified components are re-ranked in the ambiguity group according to the ranking effect.

A failure model of the system under test comprising a plurality of rules in a data base which are associated with defined patterns can also be part of the hybrid knowledge representation. The patterns are defined by Boolean combinations of event criterias which can define any event recognized, any matched symptom-fault relationship or any other data which is input to the hybrid knowledge representation. Each pattern is associated with a set of ambiguity group effects. Where a pattern is matched, the associated ambiguity group effect is selected to be applied to ambiguity group as before.

Any other model or representation of the system under test can be also be used by associating an ambiguity group effect with the result obtained from analyzing the model or representation. The result can then be integrated into the ambiguity group.

Each component in the ambiguity group points to its location in a structural model of the system under test. The structural model is analyzed starting at the location of the components at the top of the ambiguity group and maintenance options which specify operations to be performed on the system under test are output.

The results of the tests performed can be further analyzed. These actual results can be compared to expected results associated with the performed maintenance option. Each expected result is associated with two sets of ambiguity results. Based on the comparison, the appropriate set of ambiguity group effects are selected to be applied to the ambiguity group.

The components in the ambiguity group can be grouped together according to structural or functional relationships before analysis of the structural model. In this way, the maintenance options can suggest related operations to be performed.

Furthermore, the hybrid knowledge representation need not include every model of the system under test previously described. Any combination of the event based representation, the symptom-fault model and the failure model with the structural model can be used. The model or models which most accurately represent the system under test can, therefore, be selected.

DESCRIPTION OF THE PREFERRED EMBODIMENT

The diagnostic tool in the preferred embodiment of the present invention uses a hybrid knowledge representation of a system which integrates causal and heuristic representations of the system to improve diagnostic and monitoring capabilities and to obtain more flexible reasoning in the analysis of the data from the system. The causal relationships of the systems are embedded in an event based representation of the system and in a structural model of the system. The event based representation provides a temporal definition of system performance from which predefined events, which can occur during system operation, are recognized. The structural model defines the physical connectivity, hierarchy and static character of the system on a component by component basis. The heuristic relationships of the system are embedded in a rule based symptom-fault model and in a rule based failure model. These models embody the knowledge of the expert technician and/or the system designer and are very similar to known heuristic systems.

Figure 1:
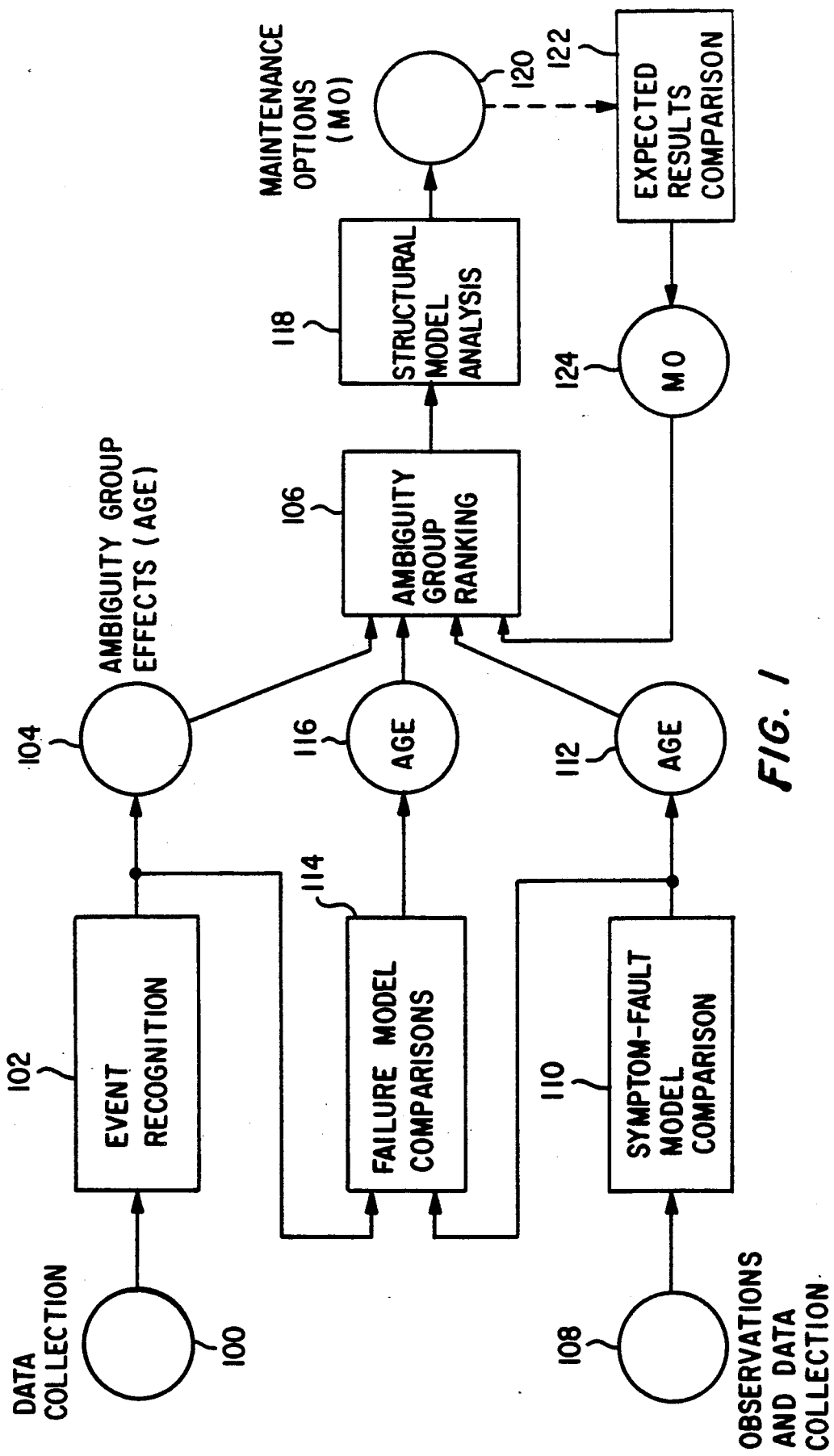
FIG. 1 illustrates the steps performed to analyze faults in a system in accordance with a preferred embodiment of the present invention.

FIG. 1 illustrates the steps performed by the diagnostic tool in the analysis of the hybrid knowledge representation in accordance with a preferred embodiment of the present invention. In step 100, a plurality of data samples are collected from the system under test during its operation. In step 102, the collected data is compared to the event based representation of the system to perform event recognition. In this step, events which are pre-defined by the event based representation and that occur during the operation of the system under test are recognized. Each event defined by the event based representation is associated with a plurality of ambiguity group effects, each of which specfies one or more components from the system under test which are either operationally suspect of absolved from suspicion as a result of the event being recognized and a ranking effect for each component. After analysis of the recognized events and events related to the recognized events, the appropriate ambiguity group effects from each recognized event are applied in step 104.

In step 106, the ambiguity group effects are applied to an ambiguity group, which is a ranked list of all system components. Initially, all the components in the ambiguity group have the same arbitrary ranking, say 0. Step 106 causes the components in the ambiguity group to be re-ranked according to the ranking effect from the ambiguity group effects output in step 104, so as to be ordered according to their probability of failure.

The heuristic relationships specified in a symptom-fault model of the system and a failure model of the system are integrated with the steps 100 to 106, in accordance with a preferred embodiment of the invention. In step 108, the operation of the system under test is observed and data is collected during the observation.

In Step 110, the observed data is compared to a symptom-fault model which comprises a plurality of symptom-fault relationships. The comparison determines the subset of symptom-fault relationships from the symptom-fault model which are matched by the observed data and, therefore, exhibited by the operation of the system under test. Each of the plurality of symptom-fault relationships in the model is associated with a set of ambiguity group effects each of which specifies one or more components and a ranking effect for each component, as before. In step 112, the set of ambiguity group effects associated with each of the symptom-fault relationships determined in step 110 are applied to the ambiguity group in step 106, so the components specified by the ambiguity group effect are re-ranked according to the specified ranking effect.

In step 114, a failure model of the system under test, comprising a plurality of rules, is analyzed. Outputs from the event recognition performed in step 102, from the symptom-fault analysis performed in step 110 or from any other source are compared to event criteria from the failure model which specify patterns that correspond to the rules in the model. Each pattern has associated with it a set of ambiguity group effects, as before. In step 116, the set of ambiguity group effects corresponding to recognized patterns from the failure model are output. In step 106, the output set of ambiguity group effects are applied to the ambiguity group, as previously described.

In step 118, a structural model of the system under test that specifies component connectivity is analyzed, starting with the components which are ranked at the top of the ambiguity group and, therefore, most suspect. In step 120, maintenance options are output as a result of the analysis fo the structural model. The maintenance options specify possible operations which can be performed on a component by a technician. In step 122, the results obtained from performing the specified maintenance options can be compared to the expected results of performing those options. Each expected result is associated with ambiguity group effects, as before. Appropriate ambiguity group effects are selected for output in step 124 for use in step 106, where the specified components are re-ranked in the ambiguity group according to the ranking effect.

Figure 2:
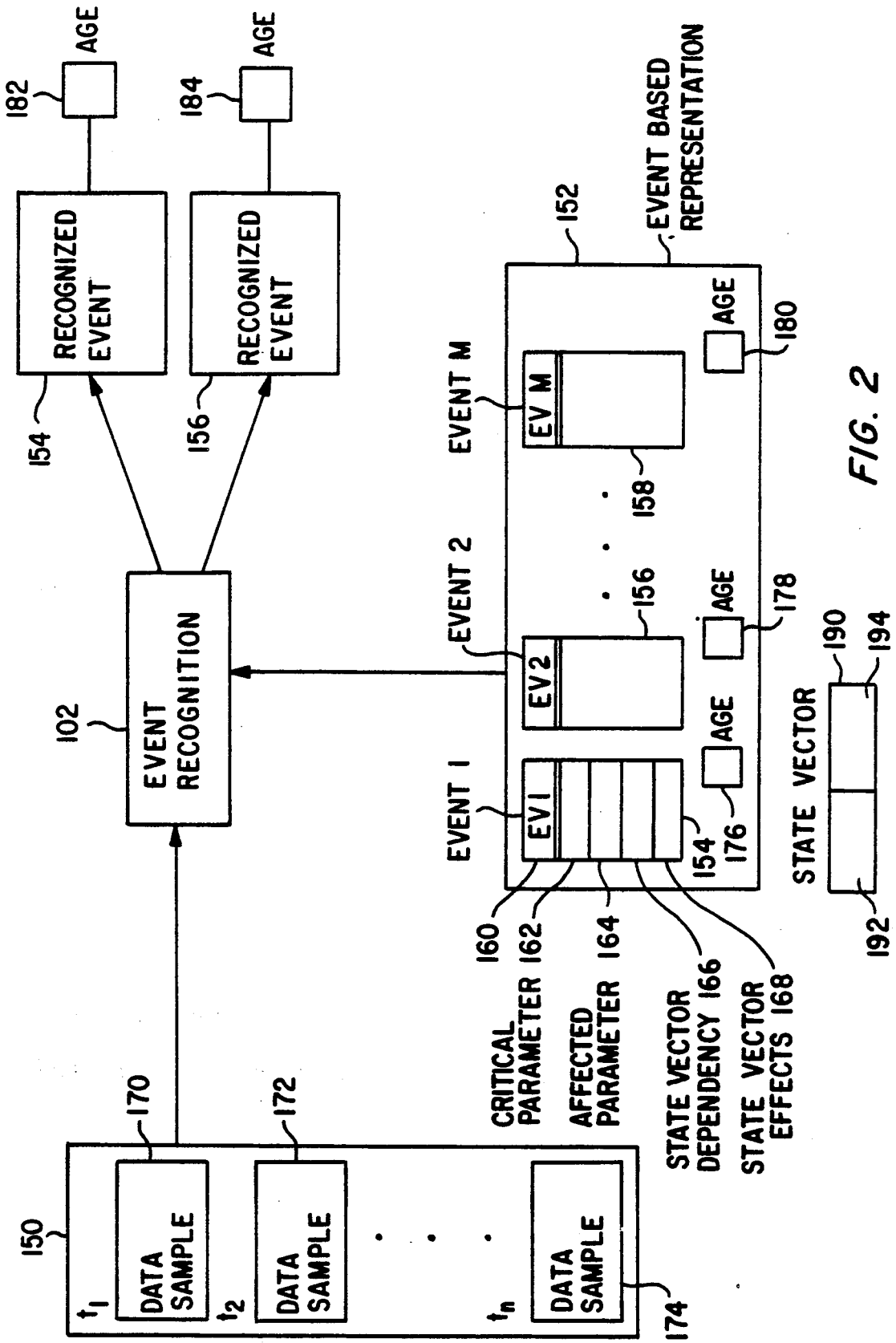
FIG. 2 illustrates the use of an event based representation of the system under test in accordance with a preferred embodiment of the present invention.
Figure 3:
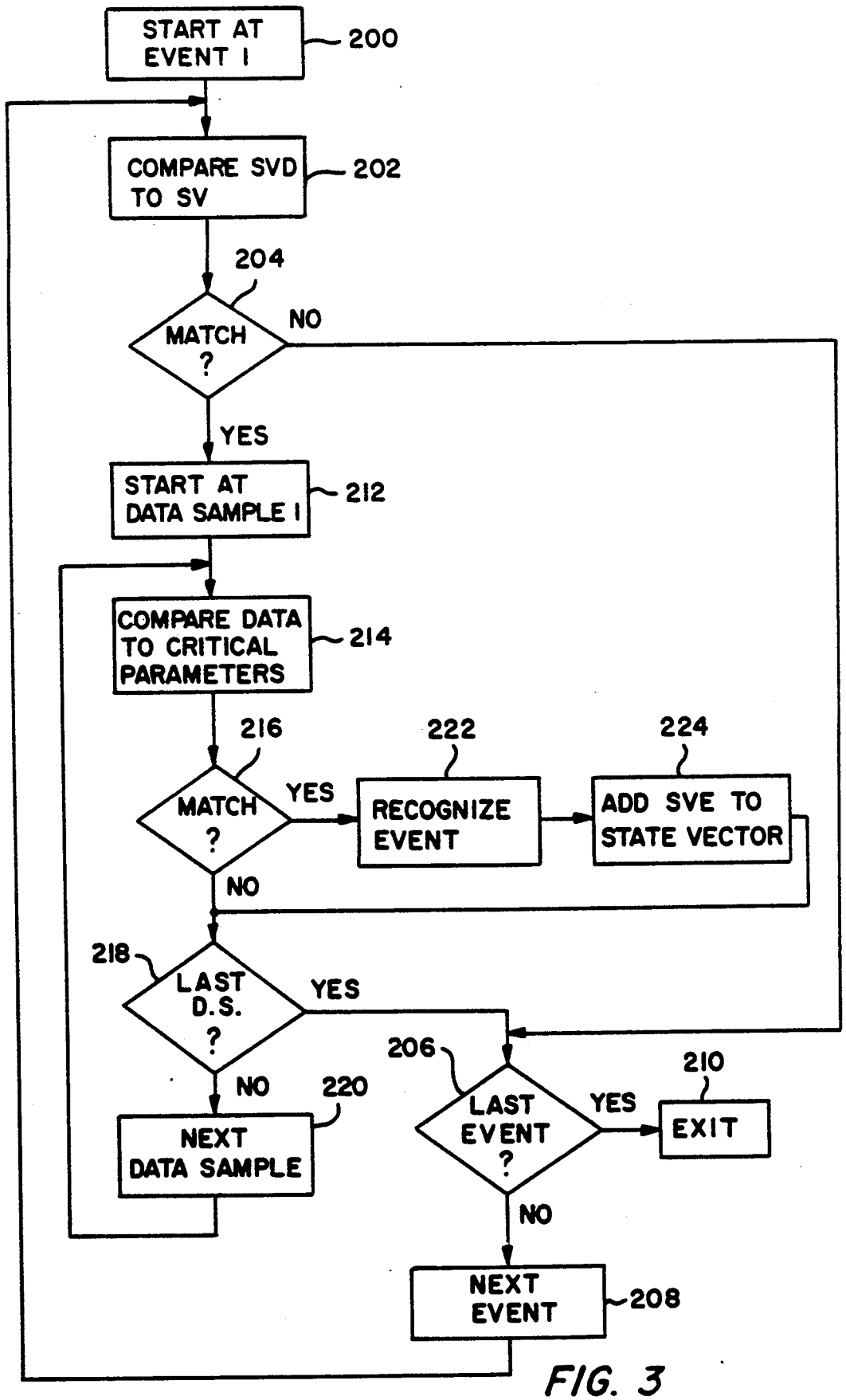
FIG. 3 illustrates the step of comparing collected data to other event based representation to perform event recognition.
Figure 4:
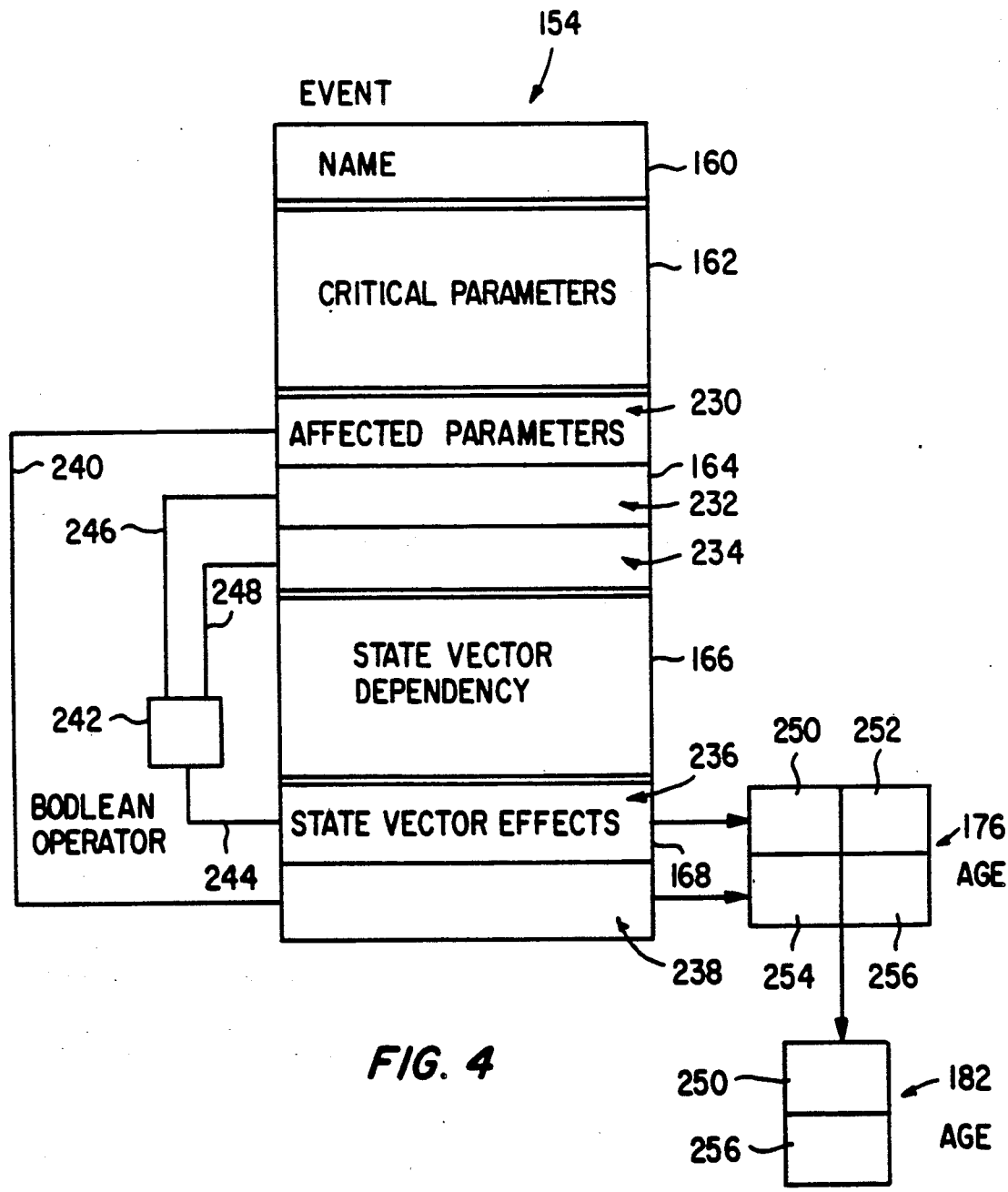
FIG. 4 illustrates the analysis of a recognized event to select an ambiguity grorup effect for output.

A more detailed description of the steps shown in FIG. 1 is now provided. FIGS. 2 through 4 illustrate the steps associated with the use of the event based representation of the system and its effect on the ambiguity group.

In step 102, event recognition is performed by comparing the collected data 150 to the event based representation 152 of the system, as shown in FIG. 2. The event based representation 152 provides a temporal definition of the performance of the system under test. It comprises a plurality of event records 154. 156 and 158 stored in a data base, each of which defines an event which can occur during the operation of the system. The level of representation is determined by the inherent testability of the system under test. It is only necessary to represent the system to a level at which the system operation can be measured. Each event record 154 to 158 is characterized by the name, phase and function of the event at location 160 and is represented by a number of parameters. These parameters include one or more critical parameters at location 162 by which the event is recognized, affected parameters at location 164 which should be affected by the occurrence of the event, state vector dependencies at location 166 which define preconditions that must exist in the system for the event to be recognized and state vector effects at location 168.

The data 150 collected from the system in step 100 comprises a plurality of data samples 170, 172 and 174. This data 150 represents the operational characteristics of the system from which the defined events of the event based representation 152 are recognized in step 102. These samples are time tagged so that sample 170 is associated with time $t_1$, sample 172 is associated with time $t_2$ and so on. Further, calculations can be performed on the collected data 150, and included in the data samples 170 to 174 for use in the event recognition process of step 102 or the pattern recognition process of step 114.

The data 150 can be collected by any known data acquisition technique. In a preferred embodiment, the data 150 is collected from the system and time-tagged by a programmable, intelligent acquisition module, such as product number AVME-9110, manufactured by Acromag.

This module affords a plurality of sampling rates as well as a plurality of channels which are programmably selectable. It includes memory to store the plurality of records 154 to 158 of the event based representation 152, memory to store the collected data 150 and an on board microprocessor which enables the necessary calculations from the data 150 and the subsequent event recognition of step 102. By using a programmable, intelligent data acquisition system having sufficient memory to store the event based representation 152 and the data 150, real time event recognition in step 102 is obtainable. A single Acromag acquisition module should be sufficient for most systems, however, if greater acquisition capability is needed additional modules or a different data acquisition module with greater capacity can be utilized.

The event recognition process of step 102 will now be described with reference to FIGS. 2 and 3. FIG. 3 illustrates the event recognition steps of step 102 in greater detail. In step 200, the first event 154 in the event based representation 152 is selected. In step 202, the state vector dependencies at location 166 in event record 154, which define the preconditions that must exist in the system under test for the defined event to have occurred, are compared to a history of events that occurred during operation of the system under test. The history is embodied in a state vector 190 which is a list of the state vector effects from location 168 of the events recognized in step 102. The state vector 190 must be updated every time an event is recognized. At the start of diagnostics, the state vector 190 is either empty or loaded with initial values.

In step 204, the state vector dependencies for the first event record 154 and the state vector 190 are analyzed to determine if the preconditions specified by the state vector dependencies have occurred. If the preconditions are not found, the event 154 is not recognized. In step 206, the event based representation 152 is examined to see if there are more events. If there are, the next event is retrieved in step 208. If there are no more events, the analysis is ended in step 210.

If, in step 204, a match is found between the state vector dependency of event record 154 and the state vector 190, then the event recognition analysis for event record 154 continues. In step 212, the first data sample 170 from the collected data 150 is selected. In step 214, the data sample 170 is compared to the critical parameters found at location 164 in the event record 154. In step 216, it is determined whether there is a match between the critical parameters and the data sample. If there is no match, the collected data 150 is examined in step 218 to see if the last data sample from collected data 150 was used. If the last data sample was used, then step 206 is repeated to see if every event record has been used. If there are more data samples, they are retrieved in step 220.

If, in step 216, a match between the critical parameters of event record 154 and the data sample 170 is found, then the event defined by event record 154 is declared recognized in step 222. In step 224, the state vector at location 168 of event record 154 is added to the state vector 190 at location 192. Then step 218 is repeated to see if there are more data samples to be used.

In this way, all data samples 170 to 174 from collected data 150 are compared to the critical parameters from every event record 154 to 158 from the event based representation 152. FIG. 2 illustrates the recognition of event 1 defined by event record 154 and event 2 defined by event record 156 by this process and output from step 102. The state vector 190, therefore, consists of a first set of state vector effects 192 from event 1 and a second set of state vector effects 194 from event 2.

The matching required by step 102 is simple one-to-one matching. The implementation of such matching is well known in the art.

As was previously mentioned, each event record 154, 156 and 158 is associated with a plurality of ambiguity group effects 176, 178 and 180, respectively. Each ambiguity effect specifies one or more components which are either operationally suspect or absolved as a result of the analysis and a ranking effect for each of the specified components. FIG. 2 illustrates events 154 and 156 as having been recognized in step 102. A subset of ambiguity group effects 182 selected from the set of ambiguity group effects 176 is output with event record 154. Similarly, a subset of ambiguity group effects 184 selected from ambiguity group effects 178 is output with event record 156.

FIG. 4 illustrates the analysis of a recognized event 154 to select the subset of ambiguity group effects 182 from the set of ambiguity group effects 176 which are to be output from step 102. The event record 154 has a plurality of affected parameters 230, 232 and 234 at location 164 and a plurality of state vector effects 236 and 238 at location 168. The affected parameters 230 to 234 define the states of parameters of the system under test which should have been affected in some way by the occurrence of the event during operation of the system. The actual state of the affected parameters can be checked by reference to the collected data 150. The state vector effects 236 to 238 define the effects of the recognized event defined by event record 154 which should have occurred in the system. The state vector effects at locations 236 and 238 are related to the affected parameters at locations 230 to 236 or to the critical parameters at locations 162 either directly or by Boolean operators. Referring to FIG. 3, it is seen that state vector effect 238 is directly related to affected parameter 230 by pointer 240. The occurrence of the effect specified by the state vector effect 238 can thereby be confirmed by reference back to the data sample used to recognize the event defined by event record 154 or other data samples as needed and by comparing that data to the components state defined by the affected parameters 230. If the component state defined by the affected parameter 230 is found in the data, the state vector effect 238 is confirmed. If it is not, then the state vector effect 238 is not confirmed.

FIG. 4 also shows state vector effect 236 related to two affected parameters 232 and 234 by a Boolean operator 242 through pointers 244, 246 and 248. Any state vector effect can be so defined if appropriate. The Boolean operator 242 can define any logical combination of affected parameters. State vector effect 236 is confirmed, therefore, by referencing data from collected data 150 and comparing it to affected parameters 232 and 234 to see if the Boolean operator 242 is satisfied.

Each state vector effect is associated with sets of ambiguity group effects, one set for use if the effect is confirmed by reference to the appropriate affected parameters and another set for use if the effect is not confirmed by the reference. State vector effect 236 is, therefore, associated with a first set of ambiguity group effects 250 to be used if the effect 236 is confirmed and a second set of ambiguity group effects 252 to be used if the effect is not confirmed. State vector effect 238 is similarly associated with a first set of parameters 254 to be used if the effect is confirmed and a second set of parameters 256 to be used if the effect is not confirmed. The combination of ambiguity group effects 250 to 256 comprise the ambiguity group effects 176 associated with event record 154. In step 104, the appropriate subsets of ambiguity group effects for each recognized event is selected based on the analysis of the affected parameters and the state vector effects as described. Referring to FIG. 3, assume the effect specified by the state vector effect 236 is confirmed by reference to affected parameters 232 and 234, so that the first set of ambiguity group effects 250 is selected for use with output 182. Also assume the effect specified by the state vector effect 238 is not confirmed by reference to affected parameter 230, so that the second set of parameters 256 associated with state vector effect 238 is selected for use with output 182.

Each ambiguity group effect 250 to 256 specifies what components are suspect or absolved as a result of the event being recognized and a rank for each component according to the level of suspicion for the component.

In addition to analyzing events recognized from the event based representation 152 to select appropriate ambiguity group effects, events related to the recognized events can also be analyzed to select ambiguity group effects. For example, if the system under test normally progresses through a sequence of four events but only three were recognized, the fourth unrecognized event might also be used to select ambiguity group effects.

Figure 5:
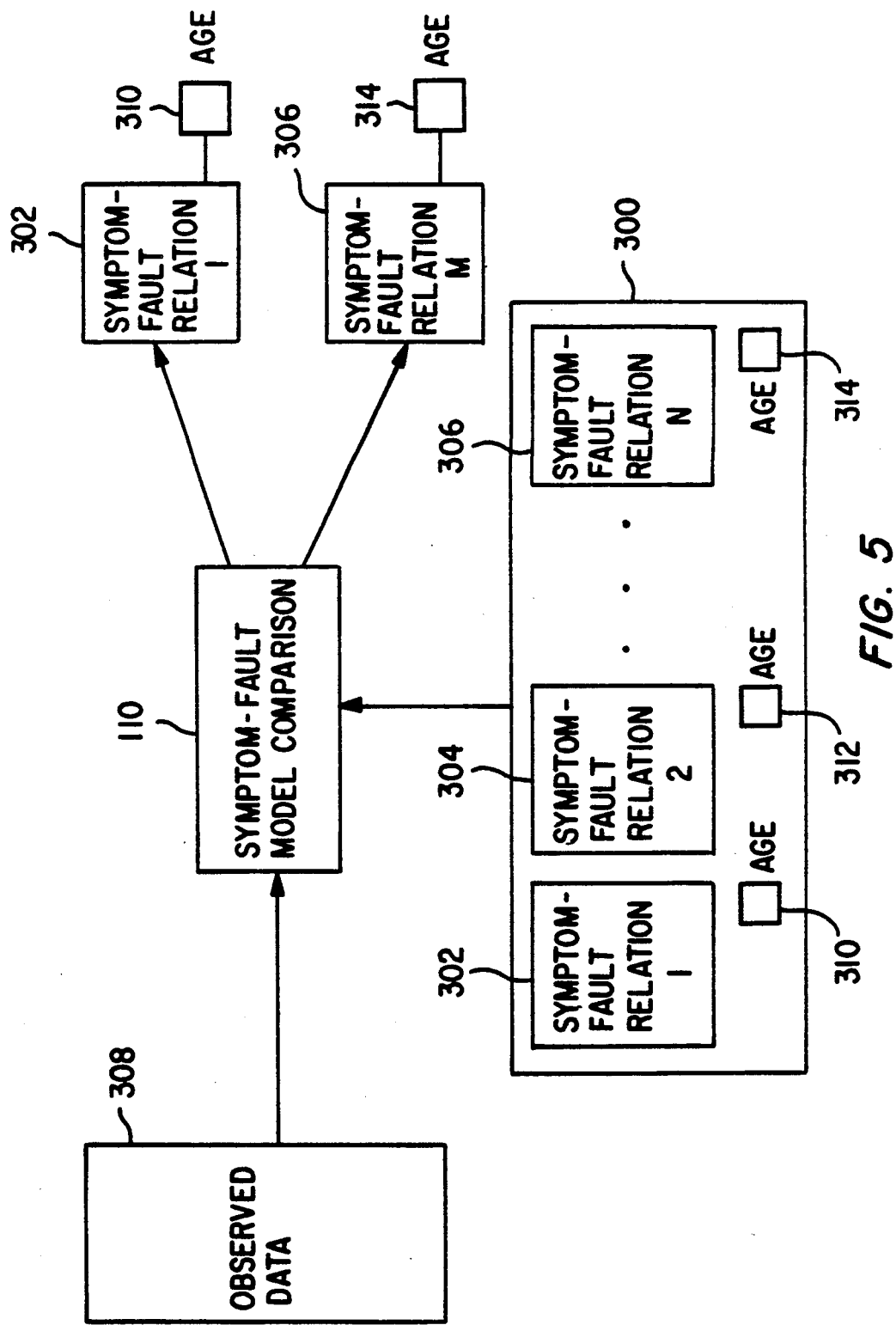
FIG. 5 illustrates the use of a symptom-fault model in accordance with a preferred embodiment of the present invention.
Figure 6:
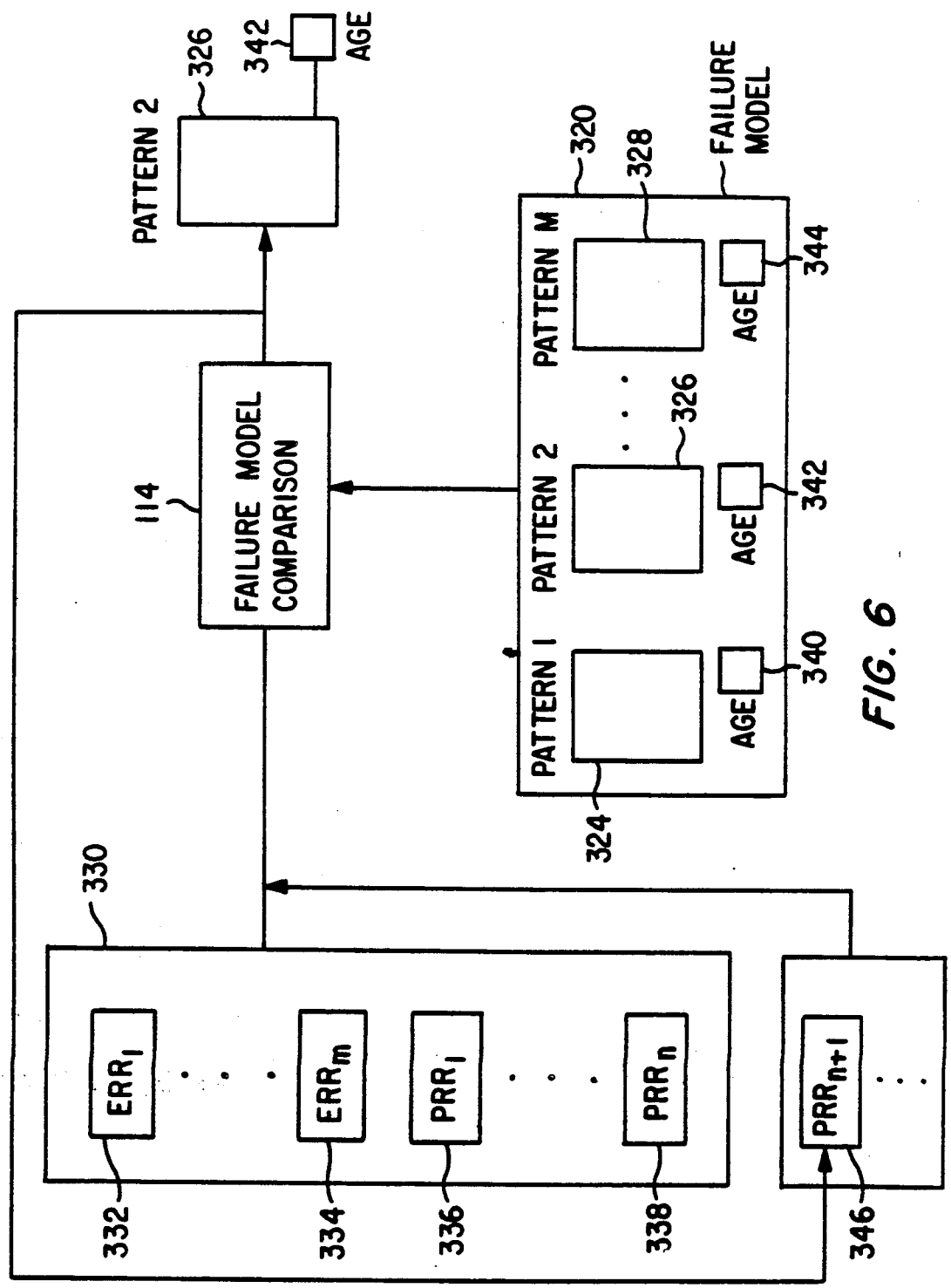
FIG. 6 illustrates the use of failure model in accordance with a preferred embodiment of the present invention.

Referring to FIG. 3, the heuristic rules embodied in a symptom-fault model and a failure model are integrated into the diagnostic tool in steps 108 to 112 and in steps 114 to 116, respectively. FIGS. 5 and 6 illustrate the these steps in greater detail.

FIG. 5 illustrates the use of symptom-fault model 300 in step 110. The symptom-fault model 300 comprises a plurality of symptom-fault relationships 302, 304 and 306 which apply to the system under test. The symptom-fault relationships 302 to 306 are stored in a data base. Such symptom-fault models containing a set of heuristic rules descriptive of the symptom-fault relationships of the system under test are well known. The data for these models is collected and derived from technical orders, repair manuals, technician observations, logistics data or any other source of system failure data.

To use the symptom-fault model 300, the operation of the system under test is observed in step 108. The observed data 308 is formatted to allow comparison with each symptom-fault relationship 302 to 306. In step 110, all of the observed data 308 is compared to each one of the symptom-fault relationships 302 to 306 in the symptom-fault model 300 to find those relationships which match the observed data and, therefore, are applicable to the operation of the system under test.

Each symptom-fault relationship 302, 304 and 306 is associated with a set of ambiguity group effects 310, 312 and 314, respectively, each of which specify one or more components and a ranking effect for each of the specified components. Where the comparison made in step 110 specifies the applicability of any of the symptom-fault relationships 302 to 306 to the operation of the system under test, the associated set of ambiguities are output in step 112. In FIG. 5, for example, the symptom-fault relationships 302 and 306 are determined to be applicable to the system under test in step 110, so that the associated sets of ambiguity group effects 310 and 314 are output.

FIG. 6 illustrates the use of the failure model 320 in step 114 in greater detail. The failure model 320 comprises a plurality of heuristic rules which define potential failures in the system under test. Failure models are well known and are typically presented in the form of If-Then rules. The failure model 320 of the present invention comprises a plurality of patterns which are associated with each rule. The failure model 320, therefore, comprises a plurality of patterns 324, 326 and 328.

The inputs 320 used for comparison against the patterns of the failure model 320 are derived from several sources. Events recognized in step 102 are utilized to form Event Recognition Records 332 and 334. Each Event Recognition Record 332 and 324 also has a pointer that specifies the location of the data sample 170 to 174 from which the event was recognized. In this way, the data samples 170 to 174 are also available for comparison to the patterns of the failure model 320. Similarly, the symptom-fault relationships which were found to exist in step 110 are used to form pattern recognition records 336 to 338.

The patterns 324 to 328 of the failure model 320 are defined by logical combinations of event criteria which can correspond to the event recognition records 331 to 334, to the pattern recognition records 336 to 338, or to any other inputs 330 which may be applicable. In step 114, all of the inputs 330 are compared to each pattern 324 to 328 in the failure model 320. The matching required to perform step 114 is significantly more difficult than the matching required to perform event recognition in step 102. A "many to many" matching strategy is used in the preferred embodiment because each recognition record 332 to 338 can have many component parts that must be compared to a pattern 324 to 328 which may be defined by many event criteria. In the preferred embodiment, CLIPS, an artificial intelligence language, is used to implement a matching algorithm based on the Rete Network. Other languages which can be used include OPS5 and SOAR.

Each pattern 324, 326 and 328 in the failure model 320 is associated with a set of ambiguity group effects 340, 342 and 344, respectively, as before. When the matching performed in step 114 determines that a pattern exists, it is output with its associated set of ambiguity group effects. In FIG. 6, for example, pattern 326 has been recognized so that the associated set of ambiguity group effects 342 is output in step 116.

When the pattern 326 is recognized in step 114, a new pattern recognition record 346 is developed and added to the input set 330. The matching performed in step 114 continues until all of the pattern recognition records, including those developed during the matching, have been compared to the failure model 320.

Figure 7:
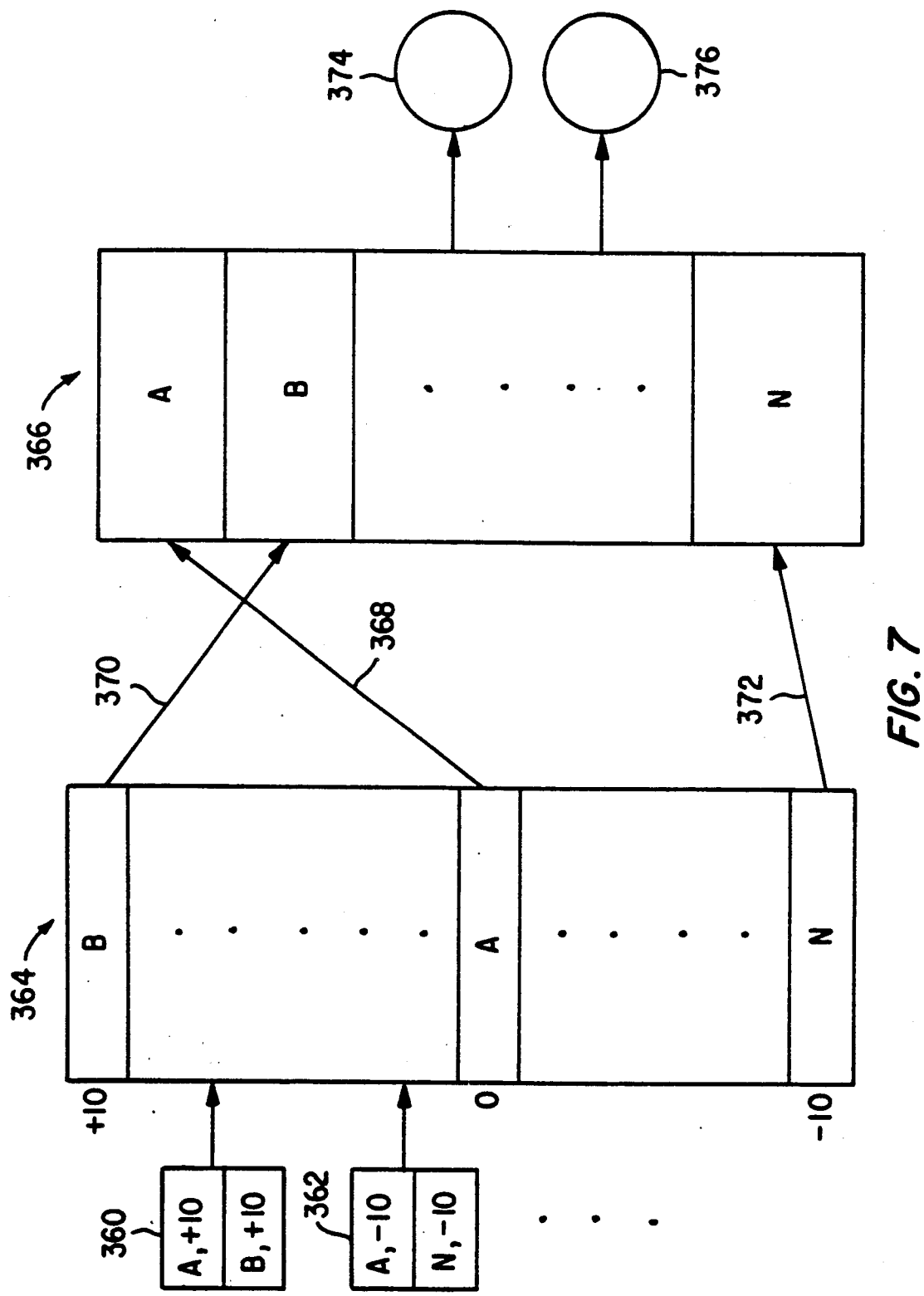
FIG. 7 illustrates the effect of ambiguity group effects on the ambiguity group and ambiguity group's pointers to a structural model of the system under test.

FIG. 7 illustrates two sets of ambiguity group effects 360 and 362, an ambiguity group 364 and a structural model 366 of the system under test. The ambiguity group 364 comprises a ranked listing of system components as specified by the sets of ambiguity group effects 360 and 362 and pointers 368, 370 and 372 which are associated with each component. Initially, all components in the ambiguity group 364 are equally ranked at an arbitrary number, say 0. As each model or representation of the system under test is analyzed and re-analyzed, the ambiguity group effects 360 and 362 are generated, each of which specify one or more system components which are to be re-ranked and the ranking effect to be applied to the component in its ambiguity group ranking. Ambiguity group effects 360 and 362 each specify two system components to be re-ranked in the ambiguity group 364 and a ranking effect for each of the two specified components. The ranking effects are arbitrary numbers which only have meanings relative to other ranking effects. The ranking effect for a given ambiguity group effect should, therefore, be chosen to reflect the accuracy of the analysis.

In step 106, each set of ambiguity group effects 360 and 362 are applied to the ambiguity group 364. Initially, all components A, B and N in the arbitrary group have a rank of 0. Ambiguity group effect 360 specifies that system components A and B are suspect, and should be re-ranked with a ranking effect of +10 applied. Ambiguity group effect 362 specifies that system components A and N are not suspected. The ranking effect, −10, is applied to lower the ranking of component A to 0, as indicated. Component N is re-ranked with a ranking effect of −10 applied. The ambiguity group effects 360 and 362 can be generated by any of the analysis steps previously discussed or by any other model of the system under test.

Each component A, B and N in the ambiguity group 364 is associated with pointers 368, 370 and 374, respectively, which point to the locations of the components in the structural model 366. After the processing of all sets of ambiguity group effects 360 and 362, the ambiguity group 364 ranks each component in the list according to its likelihood of failure. The structural model 366 can now be analyzed by referencing the system components at the top of the ambiguity group 364, such as component B, and locating the component in the structural model 366 by means of the associated pointer, in this case pointer 370.

The structural model 366 is similar to known structural models in that it specifies the system's component connectivity and hierarchy. Previous diagnostic tools have had difficulty utilizing such structural models of complex systems, because of the large number of computations needed to analyze the structural model. The diagnostic tool of the present invention makes the use of such models more computationally attractive than other analytical tools by pointing to the location in the structural model component with the greatest likelyhood of failure, thereby avoiding unnecessary and lengthy computations.

In addition to the specification of system characteristics such as connectivity and hierarchy, the structural model 366 in accordance with a preferred embodiment of this invention includes a qualitative description of the components represented. Included in the description is a list of maintenance options possible for each component. This might include special test or calibration procedures, or replace and repair procedures. The analysis of the highest ranked components in the ambiguity group leads to the structural model 366 and yields one or more of these maintenance options. FIG. 7 illustrates two maintenance options 374 and 376 being output as a result of the analysis.

Figure 8:
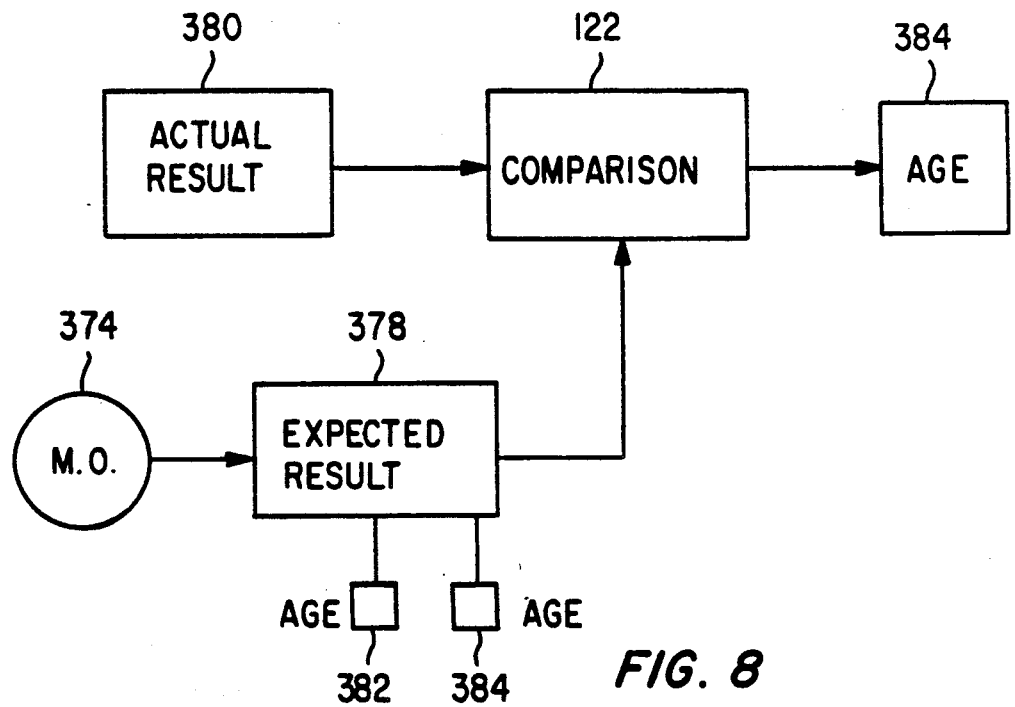
FIG. 8 illustrates the comparison of the actual results of a test performed on a system under test to the expected results.

Associated with each maintenance option is an expected result. FIG. 8 illustrates expected result 378 being associated with maintenance option 374. As before mentioned in describing step 122, the actual result 380 obtained in performing the maintenance option 374 can be compared to the expected results 378. Each expected result 378 is associated with two sets of ambiguity group effects 382 and 384, a first set 382 for use if the expected results 378 are confirmed by the actual results 380 and a second set 384 for use if the expected results 378 are not confirmed. The sets of ambiguity group effects 382 and 384, as before, specify components which should be re-ranked in the ambiguity group according to an associated ranking effect in step 106. As a result of the comparison step 122, the appropriate set of ambiguity group effects 382 or 384 is output for use in step 106. FIG. 8, for example, illustrates the case where the expected results 378 are confirmed by the actual results 380, so that the first set of ambiguity group effects 382 is selected to be an output 382 from step 124. The step 122 can be repeated every time a maintenance option is performed.

Figure 9:
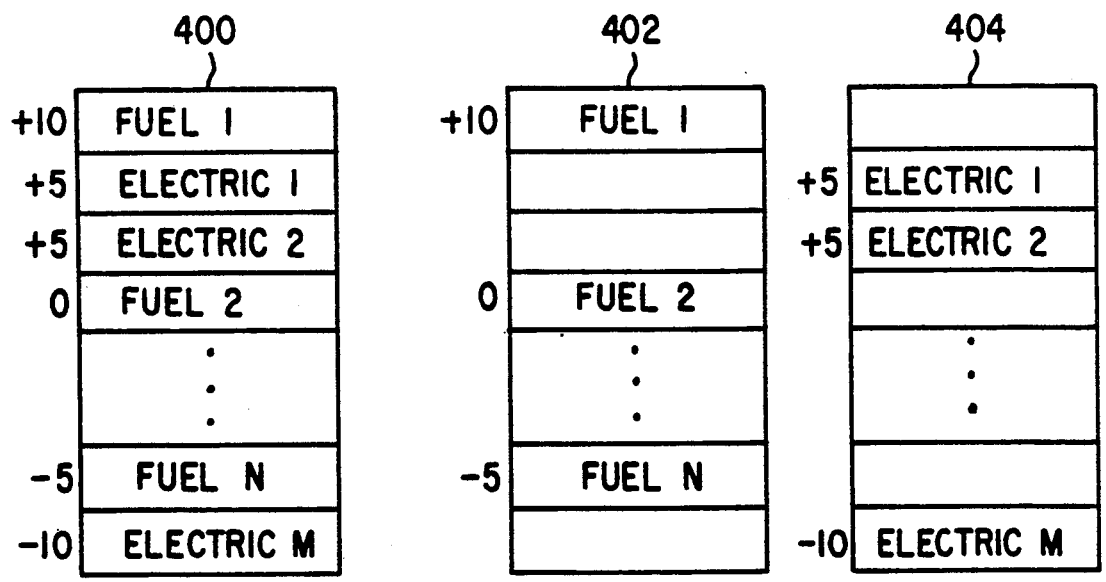
FIG. 9 illustrates the grouping of related components in the ambiguity group prior to the analysis of the structural model.

As a further step, once the ranking of components in the ambiguity group 364 is complete, but before the analysis of the structural model 366 in step 118, the components in the ambiguity group 364 can be grouped according to functional or structural relationships. In this way a logical progression of diagnosis through the system can proceed, so that the maintenance options which are output in step 112 do not suggest the testing of unrelated components. This is further illustrated in FIG. 9, wherein ambiguity group 400 contains a plurality of components from the fuel sub-system of the system under test and a plurality of components from the electrical sub-system of the system under test, all having a variety of ranks. According to this step, which is performed after the step 106 but before step 118, the components which are functionally related to the fuel sub-system are selected to form a first group 402 while the components which are functionally related to the electrical sub-system are selected to form a second group 404. The analysis of the structural model 366 in step 118 can then proceed using one of the functionally related ambiguity groups 402 or 404. One sub-system at a time can be, therefore, completely tested.

The invention is not limited to the use of the models and representations discussed. Other models, representations or factors which characterize the system can be used by assigning a set of ambiguity group effects to each result obtained from the use of the alternative model, representation or factor. In this way, the most accurate characterization of the system under test or combination of characterizations can be used to obtain the optimum diagnostic result. The assigned sets of ambiguity group effects can then be applied to the ambiguity group 364 in step 106. By way of example only, results obtained from the use of reliability statistics, Failure Modes and Effects analysis (FMEA) and maintenance histories can be used in this manner.

Furthermore, the invention does not require the use of all of the steps and all of the system representations or models previously enumerated. If any of the representations or models of the system under test are of low quality or if any step yields consistently poor results they can be omitted from the diagnostic tool. This might occur more frequently in the case of heuristic rule based knowledge representations, wherein an adequate set of rules is often difficult to develop.

Figure 10:
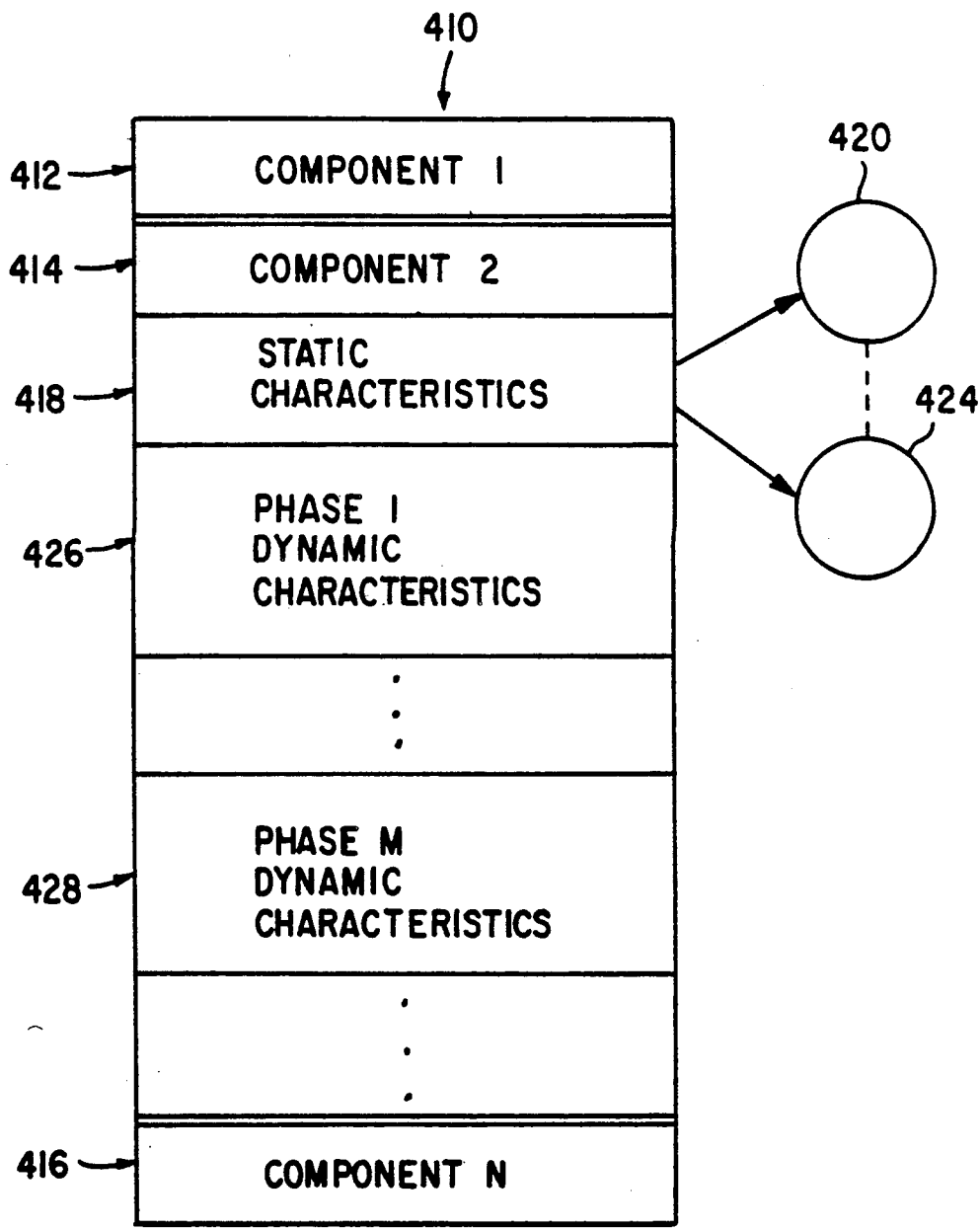
FIG. 10 shows an Event Structured Component Model.

In the event that the previously described steps do not diagnose the fault in this system under test, the analysis may be further expanded in accordance with an alternate embodiment of the present invention. Referring to FIG. 10, and Event Structured Component Model 410 is illustrated. This model 410 is an expansion of the structural model 366 described before and to other known structural models.

The model 410 comprises a description of a plurality of components 412, 414 and 416. The model 410 includes static characteristics at location 418 for each component 412 to 416 as does the structured model 366. The static characteristics 418 describe the component repair profile, in particular the testability and accessibility of the component. The maintenance options 418 and 420 which are output in step 120 of the preferred embodiment are also included here. These characteristics 416 can be used by a system technician to determine what to do next. Further tests on the component can be performed if the model in 410 indicates that the component is testable. Additionally, adjustments to the component can be made if the model 410 indicates the component is accessible to the technician. These static characteristics 416 are accessed via the ambiguity group pointers in the preferred embodiment of the invention. These static characteristics 416 can be subsetted along with a static connectivity representation to construct the structural model 366.

The Event Structured Component Model 410 is differentiated from the structural model 366 by the inclusion of dynamic characteristics of each component at locations 422 through 424. The dynamic characteristics at a particular location characterize the components connectivity, hierarchy, performance characteristics and function at a given phase or event within the system under test. The connectivity of the component is characterized by specifying the inputs and outputs to the component and the connective medium. The hierarchy of the component describes super and subcomponents of the component. In other words, the hierarchy of the component describes whether the component is part of another group of components or consists of a group of components. The performance characteristics of the component are also included in its dynamic characteristics.

To use the Event Structured Component Model 410, the operational history of the APU contained in the state vector developed in step 102 is analyzed to determine the phase of failure of the system. By knowing the normal sequence of events in the operation of the system under test, and by comparing it to the recognized events, the phase of failure of the system under test can be determined. The Event Structured Component Model 410 can than be accessed by component according to the ambiguity group as previously described. The component in the model 410 is further referenced by the determined phase of failure. So, for example, if component 2 at location 414 is determined by analysis of the ambiguity group to be the most suspect component, that component in model 410 is referenced. If the failure of the system is determined to have occurred in phase 1 by analysis of the state vector obtained in step 102, then the dynamic characteristics of phase 1 of the second component at location 422 are accessed. These dynamic characteristics are used to recreate what the system should look like as compared to the actual operational characteristics of the system.

This procedure can be used to suggest further components to be analyzed through the Event Structured Component Model 410. This search, however, must be limited to prevent computational problems. It may be limited by data derived during event recognition, by functional and structural connections, by connectivity paths or by components having a low ranking in the ambiguity group.

The diagnostic tool of the present invention is applicable to a variety of systems. The diagnostic tool comprises a hybrid knowledge representation and a series of analytical steps as described herein to use the hybrid knowledge representation. In applying the diagnostic tool, the analytical steps are system independent, so that any of the steps described herein can be used for any system. The knowledge representations, however, are system dependent and must be modified to represent the system desired to be analyzed.

An example of the diagnostic tool as applied to an Auxiliary Power Unit (APU) for an airplane is now given. The application of the diagnostic tool to an APU is also described in "APU Maid: An Event-Based Model For Diagnosis", published Nov. 3, 1987 at the AUTOTESTCON meeting, which is incorporated herein by reference. Auxiliary Power Units are gas turbine engines used for aircraft ground base support for pneumatic power and generator support and in the air for both supplemental and emergency power support. The APU can either be used from a ground cart or installed in the aircraft as part of the pneumatic system. The APU's engine is comprised of a compressor/turbine section, with attaching components that make up the units fuel, bleed air, lubrication and electrical systems.

Table 1 illustrates a single data sample having label DS200 which is collected during the operation of the APU. The data sample provides six channels of analog data, including the time of the data sample, the oil pressure, the compressor discharge pressure, the fuel pressure, the exhaust gas temperature and the engine rpm. It also provides 16 channels of digital data as indicated.

TABLE 1

| DATA SAMPLE DS200 | | | |
|---|---|---|---|
| ANALOG CHANNELS | PARAMETER | VALUE | UNIT |
| 0 | TIME | 2 | SEC |
| 1 | Poil | 2.1 | PSI |
| 2 | Pcompressor discharge | 0 | PSI |
| 3 | Pfuel | 40.0 | PSI |
| 4 | EGT (exhaust gas temperature) | 100.0 | F |
| 5 | % RPM (100% = 39,000 | 11 | % RPM |

TABLE 1-continued

| DATA SAMPLE DS200 | | |
|---|---|---|
| RPM OVERSPEED = 44,000 RPM) | | |
| DIGITAL CHANNEL | PARAMETER | DISCRETE VALUE |
| 0 | CENTRIFUGAL SWITCH (static test/REDUN 8) | 1 |
| 1 | START RELAY/START MOTOR (static test/ REDUN 9) | 1 |
| 2 | OIL P. DOOR CNTRL (NC) | 1 |
| 3 | RUN SWITCH TO FHR | 1 |
| 4 | COMPRESSOR DISCHARGE SOLENOID/LOAD CONTROL VALVE (static test/REDUN 10) | 0 |
| 5 | 95% CENT/ON SPEED RELAY (NO) | 0 |
| 6 | OVERSPEED TEST/STOP | 1 |
| 7 | FUEL HOLDING RELAY | 1 |
| 8 | START SW | 1 |
| 9 | APU START RELAY | 1 |
| 10 | BLEED AIR VALVE | 0 |
| 11 | APU FUEL RELAY CNTRL (static test/REDUN 7) | 0 |
| 12 | OIL P. SEQ SW (static test/ REDUN 14) | 1 |
| 13 | OIL P. SEQ SW (NO) (static test/REDUN 15) | 0 |
| 14 | IGN UNIT | 0 |
| 15 | FUEL CONTROL VALVE SOLENOID | 1 |

Table 2 comprises a subset of event records from an event based representation of the APU. Four event records which define the start of the APU, the start of combustion within the APU, the reaction to the combustion and the actual combustion are shown.

TABLE 2

PARTIAL APU EVENT BASED REPRESENTATION

EV11 - START EVENT
(1) STATE VECTOR DEPENDENCIES
(2) CRITICAL PARAMETER "START -SW" = 1
(3) AFFECTED PARAMETERS
    "ASR" = 1
    "APU-START RELAY" = 1
    "APU-START MOTOR" = 1
    "OVERSPD-TEST-SOLDENOID" = 1
    "FHR" = 1
(4) STATE VECTOR EFFECTS & AMBIGUITY GROUP EFFECTS (AGE)
    EV1 - 1
    START-SW = 1; AGE − 10
                 = 0; AGE + 10
    ASR = 1; AGE − 10
           = 0; AGE + 10
    APU-START RELAY = 1; AGE − 10
                             = 0; AGE + 10
    APU-START MOTOR = 1; AGE − 10
                             = 0; AGE + 10
    OVERSPEED-TEST-SOLENOID = 1; AGE − 10
                                       = 0; AGE + 10
    FHR = 1; AGE − 10
           = 0; AGE + 10
EV2 - COMBUSTION-START EVENT
(1) STATE VECTOR DEPENDENCIES
    START-EVENT − 1
(2) CRITICAL PARAMETERS
    P-OIL = 2 − 3.5 PSI
    5 RPM = GT 0
(3) AFFECTED PARAMETERS
    OIL-P-SEQ-SW = 1
    IGNITION-UNIT = 1
    TIME = LT 7 SEC
(4) STATE VECTOR EFFECTS
    EV2-1
        OIL-P-SEQ-SW = 1; AGE − 10
                           = 0; AGE + 10
EV3 - COMBUSTION-REACT EVENT
(1) STATE VECTOR DEPENDENCIES
    COMBUSTION-START-EVENT - 1
(2) CRITICAL PARAMETERS
    P-FUEL - GT 0 PSI
(3) AFFECTED PARAMETERS
    P-FUEL = 40 PSI
    FUEL CONTROL VALVE SOL = 1
(4) STATE VECTOR EFFECTS
    EV3 - 1
    FUEL CONTROL VALVE SOLENOID AND P FUEL
        = 1; FUEL CONTROL VALVE SOL, - AGE − 10
        = 0; FUEL CONTROL VALVE SOL, AGE + 10
EV4 - COMBUSTION EVENT
(1) STATE VECTOR DEPENDENCIES
    COMBUSTION-REACT EVENT = 1
(2) CRITICAL PARAMETER
    "EGT" GT 400 F
(3) STATE VECTOR EFFECTS
    EV4 = 1

TABLE 2-continued
PARTIAL APU EVENT BASED REPRESENTATION

IGNITION-UNIT = 1; AGE − 10
             = 0; AGE + 10

Assume that Events 1 and 2 have been recognized by having their critical parameters matched by data samples prior to DS200. As a result of events 1 and 2 being recognized the state vector effects from those events have been added to the state vector, as illustrated in Table 3.

The event recognition process of step 102 for event 3 is now described. Assume that the data samples prior to DS200 have already been compared to event 3. Data sample DS200 is now compared. The first step is to check the state vector dependencies, which specify preconditions for the event to have occurred, against the state vector, which is a history of recognized events.

TABLE 3
STATE VECTOR

EV1 = 1
START-SW = 1
ASR = 1
APU-START RELAY = 1
APU-START MOTOR = 1
OVERSPEED-TEST-SOLENOID = 1
FHR = 1
EV2 = 1
OIL-P-SEQ-SW = 1
EV3 = 1
FUEL-CONTROL-VALVE-SOL = 1

The state vector dependency for Event 3, as indicated by Table 1, is that event 2 (Combustion Start Event=1) occurred. Checking the state vector in Table 3, event 2 is listed as having occurred (EV2=1) so event recognition can continue. The critical parameters of Event 3, fuel pressure greater than 0 PSI (Pfuel GT 0 PSI), is compared to data sample DS200 next. Analog channel 3 of DS200 indicates that the fuel pressure is 40 PSI, greater than 0. Event 3 is, therefore, recognized.

Event 4 is now checked. The precondition for its being recognized, event 3, is in the state vector, so that analysis of the data sample DS200 can now occur. The critical parameter for this event is that the exhaust gas temperature be greater than 400° F. Checking the data sample DS200 on analog channel number 4 it is seen that the temperature is only 100° F. This event, therefore, is not recognized. Assume no other data sample serves to recognized Event 4.

The recognized events as well as any events which were not recognized but are related to the recognized events are now analyzed to determine which ambiguity group effects to use. Referring to event 1 in Table 2, six components which are directly related to the critical parameter and the affected parameters, are listed. The appropriate ranking effect, in this case, is determined by referencing the data sample DS200 to confirm the state of the affected parameters defined in the state vector effect. Considering the first affected parameter pointed to by the state vector effect of event 1, the state of the start switch is already known since that was the critical parameter. Since the state of the start switch is 1, the ambiguity group effect that specifies a −10 ranking for that component is selected. Considering the second affected parameter, the state of the APU start relay, digital channel number 9 of DS200 shows a discrete value of 1. This compares to the state of the affected parameter as listed in event 1, confirming the state vector effect, so then the ambiguity group effect that assigns a ranking of −10 to ASR is selected. In a similar fashion, it is seen that the ambiguity group effects selected from event 1 should assign a ranking of −10 to the remaining components as well as to the components specified in the state vector effects of event 2.

Event 3 has a state vector effect defined by the logical combination of the state of the fuel control valve solenoid and fuel pressure being greater than 40 PSI. To confirm this state vector effect, therefore, both of these affected parameters must be confirmed by data sample DS200. Referring to analog channel 3, the fuel pressure is 40 PSI, confirming that affected parameter. Referring to digital channel 15, the fuel control valve solenoid activated (=1), confirming that affected parameter. Since the logical combination of affected parameters is satisfied, the state vector effect is confirmed. The associated ambiguity group effect absolving the fuel control valve solenoid with a ranking effect of −10 is selected.

Event 4 was not recognized during the event recognition step, however, it is clearly related to events 1, 2 and 3. That event is, therefore, also analyzed to determine an appropriate ambiguity group effect. The state vector effect is directly related to the ignition unit. Referring to DS200 in Table 1 it is seen that the ignition unit has a discrete value of 0. The associated ambiguity group that assigns a ranking effect of +10 is, therefore, selected for use.

Table 4 illustrates symptom/fault relationships which exist in a symptom/fault model of the APU. The APU operation is observed and data is entered based on that observation. If we assume that the observed data specifies that the starter is cranking the engine but combustion is not occurring, then the symptom/fault relationship labeled SF10 is selected. The ambiguity group effect associated with SF10 is output for use. The ambiguity group effect specifies a list of components which are suspect in a ranking effect which is associated with each component.

Table 5 illlustrates a failure model which comprises two event patterns. The first event pattern is defined by three event criteria, EC1, EC2 and EC3, which must all occur for event pattern 1 to be recognized. Event criteria 1 is further defined as the logical combination of event record 3 and not event record 4. Event criteria 2 is defined as the pattern recognition record which results from SF10 being recognized. Event criteria 3 is defined as a pattern recognition record which results form a special test which is performed on the accelerator limiter. Associated with the first event pattern is an ambiguity group effect which specifies the acceleration limiter as a suspect component and a ranking effect of +10. The second event pattern is also defined by the three event criteria of above. Event criteria 1 and event criteria 2 are the same as above, however, event criteria 3 is a pattern recognition record which results from a special test which is performed on the ignition unit. The ambiguity effect associated with the second event pattern specifies that the ignition unit is suspect and assigns a ranking effect of +10. There are many more event patterns in an APU failure model, however, only two are shown here.

If we assume that the results of the special test performed on the accelerator limiter is negative then event pattern 1 is not recognized. On the other hand if we assume that the results of the special test performed on the ignition unit is positive, then event pattern 2 is recognized and the associated ambiguity group effect, which specifies the ignition unit as a suspect component and a ranking effect of +10 is output.

TABLE 4
SYMPTOM/FAULT RECORDS

SF1
PHASE 0
TEXT - "No response from starter when start switch is actuated"
AGE - +10
AG - BATTERY/EXTERNAL-POWER
　　AIR-INTAKE-DOOR
　　FUSES
　　CENTRIFUGAL SWITCH
　　APU-START-RELAY
　　ASR
　　STARTER-MOTOR
　　STARTER-SWITCH
SF2
PHASE 0
TEXT - "Starter rotates only while start switch is depressed"
AGE - +10
AG - ASR
　　FHR
　　WIRING
　　BATTERY/EXTERNAL-POWER
SF10 (selected)
PHASE 1
TEXT - "Starter cranks engine but combustion does not occur"
AGE - +10
AG - FUEL-SUPPLY
　　WING-TANK-FUEL-VALVE
　　FUEL-PUMP
　　ACCELERATION-LIMITER
　　FUEL-CONTROL-VALVE-SOLENOID
　　IGNITION-UNIT
　　OIL-P-SEQ-SWITCH
　　OIL-SUPPLY
　　OIL-PUMP
　　OIL-FILTER
　　TURBINE-ASSEMBLY

TABLE 5
FAILURE MODEL

EP1 = EC1 AND EC2 ANY EC3
EC1 - ER3 AND NOT ER 4
EC2 - PR(S/F10)
EC3 - PR (special test Acceleration-limiter - 3)
AGE - ACCELERATION LIMITER, +10
EP2 = EC1 AND EC2 AND EC3
EC1 - ER3 AND NOT ER 4
EC2 - PR(S/F10)
EC3 - PR (special test IGNITION-UNIT - 4)
AGE
IGNITION-UNIT, +10

If we collect all of the ambiguity group effects from each recognized and analyzed event record, from each recognized symptom/fault relationship and from each recognized event pattern from the failure model and apply the ranking effects, the ambiguity group as shown in Table 6 results. The elements ranked at −10 were all specified once by any of the event records. The oil pressure sequence switch which is ranked at 0 was specified as not being suspect as the result of the event 2 being recognized, however, was suspected because of the recognition of the symptom/fault relationship labeled SF10. The fuel control valve solenoid was ranked at 0 because it was suspected with a ranking effect of +10 as a result of the symptom-fault relationship, SF10, and it was absolved from suspicion with a ranking effect of −10 as a result of the analysis of Event 3. The combined ranking effect of +10 and a −10 is zero. The components ranked at +10 resulted from the recognition of the symptom/fault relationship, SF10, from the symptom/fault model. The component ranked +20 was specified as being suspect as a result of the analysis of event 4 and as a result of the recognition of event pattern 2 from the very model.

TABLE 6
AMBIGUITY GROUP

AMBIGUITY GROUP RANKING (ALL COMPONENTS ARE RANKED; THE AGE AFFECT THE RANKING)
+20　IGNITION-UNIT (IMPLICATED BY BOTH EVENT RECOGNITION AND THE SYMPTOM)
+10　FUEL-SUPPLY
　　　WING-TANK-FUEL-VALVE
　　　FUEL-PUMP
　　　ACCELERATION-LIMITER
　　　OIL-SUPPLY
　　　OIL-PUMP
　　　OIL-FILTER
　　　TURBINE-ASSEMBLY
　0　OIL-P-SEQ-SWITCH
　　　FUEL-CONTROL-VALVE-SOLENOID
−10　START-SW
　　　ASR
　　　START RELAY
　　　START MOTOR
　　　OVERSPEED TEST SOLENOIDS
　　　FHR
　　　OIL-P-SEQ-SW
　　　FUEL CONTROL VALVE

Each component in the ambiguity group ranking is further associated with a pointer, which is not shown. This pointer is used to select the associated location of the component and a structural model of the APU. The structural model is then analyzed and maintenance options for the APU are output.

This example is intended to be illustrative and is not intended to show every feature of the invention.

We claim:

1. A method for diagnosing faults in a system under test comprising the steps of:
   analyzing a first representation of said system under test to obtain a first list of suspect components and a ranking for each of said suspect component that indicates a level of suspicion:
   pointing to a component in a structural model of said system under test according to said ranking list of suspect components;
   analyzing said structural model starting at said component; and
   outputting a maintenance option to be performed on said system as a result of said analysis.

2. The method as claimed in claim 1, wherein said first representation is an event based representation that defines the temporal performance of said system under test.

3. The method as claimed in claim 1, wherein said first representation is a heuristic rule based model of said system under test.

4. The method as claimed in claim 1, further comprising the steps of:
   before pointing to said structural model, analyzing a second representation of said system under test to obtain a second list of suspect components and a ranking for each of said suspect components on said second list which indicates a level of suspicion;
   intergrating said first list of suspect components and rankings with said second list of suspect components and rankings to obtain a integrated group of ranked suspect components.

5. The method as claimed in claim 4, wherein said first representation is an event based representation of said system under test and said second representation is a heuristic rule based model of said system under test.

6. The method as claimed in claim 1, further comprising the steps of:
   grouping related components from said first list of suspect components prior to pointing to said component in said structural model.

7. The method as claimed in claim 6, wherein functionally related components are grouped together.

8. The method as claimed in claim 6, wherein structurally related components are grouped together.

9. The method as claimed in claim 1, further comprising the step of:
   analyzing the result of performing said maintenance option and adjusting said list of suspect components accordingly to obtain a reranked list of suspect components:
   pointing to a second component in said structural model according to said reranked list of suspect components; and
   analyzing said structural model starting at said second component and outputting a new maintenance option.

10. A method for diagnosing faults in a system under test, comprising the steps of:
    analyzing a first representation of said system under test to obtain a first list of suspect components and a ranking for each suspected component that indicates a level of suspicion:
    analyzing a second representation of said system under test to obtain a second list of suspected components and a ranking for each suspected components that indicates a level of suspicion;
    obtaining an integrated list of suspect components and a ranking for each of said suspected components from said first list and second list;
    grouping related components within said integrated list of suspect components;
    pointing to a component in a structural model of said system under test according to one of the grouped lists of suspect components;
    analyzing said structrual model starting at said component; and
    outputting a maintenance option to be performed on said system under test as a result of said analysis.

11. The method as claimed in claim 10, further comprising the step of:
    analyzing the result of performing said maintenance option and adjusting said list of suspect components accordingly to obtain a reranked list of suspect components;
    pointing to a second component in said structural model according to said reranked lists of components: and
    analyzing said structural model starting at said second component and outputting a new maintanance option to be performed on said system.

12. A method for diagnosing faults in a system under test, comprising the steps of:
    comparing a plurality of data samples collected from said system under test during its operation to data in an event based representation to recognize events which occurred in said system during its operation;
    ranking a list of components in said system according to the recognized events;
    pointing to component in a structural model of said system according to said ranked list of components;
    analyzing said structural model starting at said component; and
    outputting a maintenance option to be performed on said system as a result of analyzing said component model.

13. The method as claimed in claim 12, wherein said event based representation defines the temporal performance of said system under test.

14. The method as claimed in claim 13, wherein said event based representation of said system includes a plurality of defined events, each of which includes at least one critical parameter and wherein one of said defined events is recognized when said collected data samples match a critical parameter from said one of said plurality of defined events.

15. The method as claimed in claim 12, further comprising the steps of:
    analyzing the result of performing said maintenance option and adjusting said ranking of said list of components:
    pointing to a new entry point in said event structured component model according to said reranked list of components; and
    analyzing said event structured component model at said new entry point and outputting a new maintenance option to be performed on said system.

16. The method as claimed in claim 12, further comprising the steps of:
    grouping related components which are pointed to in said structural model prior to outputting said maintenance options.

17. The method as claimed in claim 16, wherein functionally related components are grouped together.

18. The method as claimed in claim 16, wherein structurally related components are grouped together.

19. The method as claimed in claim 12, further comprising the steps of:
   prior to pointing to a component in said structural component model, comparing data observed from said system during its operation to a sympton-fault model of said system to find a subset of applicable sympton-fault relationships from said model; and
   adjusting said ranking of said list of components accordingly.

20. The method as claimed in claim 19, further comprising the steps of:
   prior to pointing to a component in said structural model, from said recognized events and from said collected data samples to a failure model; and
   adjusting said ranking of said list of components accordingly.

21. The method as claimed in claim 12, further comprising the steps of:
   prior to pointing to a component in said structural model, from said recognized events and from said collected data samples to a failure model; and
   adjusting said ranking of said list of components accordingly.

22. A fault diagnostic tool for a system under test, comprising:
   data acquisition means for collecting data from said system under test during its operation to obtain operational data;
   an event record data base for providing data representative of a plurality of predefined events that occur during operation of said system under test;
   first comparison means for comparing said operational data to said event record data base to recognize any of said predefined events that occurred during operation of said system under test;
   memory means for storing a listing of a plurality of components from said system under test in order according to their probability of failure, wherein said components and said order are specified by said predefined events recognized by said comparison means;
   a structural data base for providing data representative of said system under test's structure: and according to said listing and for outputting suggested operations to be performed on said system under test.

23. A fault diagnostic tool as claimed in claim 22, further comprising:
   a first heuristic data base for providing data representative of a plurality of symptom-fault relationships for said system under test; and
   second comparison means for comparing data observed from said system under test to said first heuristic data base to recognize a subset of said plurality of symptom-fault relationship and to control said listing in said memory means according to components and ranking effects associated with said recognized subset of symptom-fault relationships.

24. A fault diagnostic tool as claimed in claim 23, further comprising;
   a second heuristic data base for providing data representative of a plurality of failure modes for said symptom under test; and
   third comparison means for comparing said second heuristic data base to said operational data, to said predefined events recognized by said first comparison means and to said subset of sympton-fault relationships recognized by said second comparison means and to control said listing in said memory means according to components and ranks associated with any recognized failure modes.

* * * * *